(12) United States Patent
Nakajima

(10) Patent No.: US 10,037,063 B2
(45) Date of Patent: Jul. 31, 2018

(54) SEMICONDUCTOR INTEGRATED CIRCUIT INCLUDING A SYSTEM CONTROLLING CIRCUIT

(71) Applicant: Renesas Electronics Corporation, Tokyo (JP)

(72) Inventor: Hiroyuki Nakajima, Toyko (JP)

(73) Assignee: Renesas Electronics Corporation, Tokyo (JP)

( * ) Notice: Subject to any disclaimer, the term of this patent is extended or adjusted under 35 U.S.C. 154(b) by 30 days.

(21) Appl. No.: 15/066,957

(22) Filed: Mar. 10, 2016

(65) Prior Publication Data

US 2016/0306635 A1 Oct. 20, 2016

(30) Foreign Application Priority Data

Apr. 17, 2015 (JP) .................................. 2015-084749

(51) Int. Cl.
| | |
|---|---|
| *G06F 1/24* | (2006.01) |
| *G06F 1/06* | (2006.01) |
| *G06F 1/26* | (2006.01) |
| *G06F 9/4401* | (2018.01) |

(52) U.S. Cl.
CPC .................. *G06F 1/24* (2013.01); *G06F 1/06* (2013.01); *G06F 1/26* (2013.01); *G06F 9/4401* (2013.01)

(58) Field of Classification Search
CPC ....................................................... G06F 1/24
See application file for complete search history.

(56) References Cited

U.S. PATENT DOCUMENTS

| 2013/0173899 A1* | 7/2013 | Geukes | .................. G06F 21/575 713/2 |
|---|---|---|---|
| 2014/0032887 A1* | 1/2014 | Vahidsafa | .................. G06F 1/24 712/245 |
| 2014/0089712 A1* | 3/2014 | Machnicki | ................ G06F 1/26 713/324 |

FOREIGN PATENT DOCUMENTS

JP 2013-089060 A 5/2013

\* cited by examiner

*Primary Examiner* — Albert Wang
(74) *Attorney, Agent, or Firm* — McGinn IP Law Group, PLLC

(57) ABSTRACT

A system controlling circuit disclosed herein is made adaptable to programmable specification change through parameters under a secure environment that is tamper resistant. A semiconductor integrated circuit including functional blocks and a system controlling circuit is configured as below. The system controlling circuit includes a programmable timing controller and a second boot programmable sequencer and supplies a group of system control signals including at least one of a power supply control signal, reset signal, and clock signal to the functional blocks. In the system controlling circuit, the programmable timing controller adjusts either or both of sequence and timing of supplying the group of system control signals to the functional blocks, based on parameters supplied thereto and the second boot programmable sequencer reads in encrypted sequence code and data, decrypts them, and supplies the programmable timing controller with the parameters in accordance with decrypted sequence code and data.

20 Claims, 11 Drawing Sheets

SEMICONDUCTOR INTEGRATED CIRCUIT INCLUDING A SYSTEM CONTROLLING CIRCUIT

CROSS-REFERENCE TO RELATED APPLICATIONS

The disclosure of Japanese Patent Application No. 2015-084749 filed on Apr. 17, 2015 including the specification, drawings and abstract is incorporated herein by reference in its entirety.

BACKGROUND

The present invention relates to a semiconductor device and can be suitably used for, particularly, a system controlling circuit of a microcomputer.

A system controlling circuit which is mounted within a microcomputer or the like is a circuit block that supplies, inter alia, a power supply, reset signal, and clock across an LSI (Large Scale Integrated). This circuit controls, inter alia, timing of supply to functional blocks within the LSI. The circuit may control the supply and stop of a power supply and clock to the functional blocks or may control a power supply voltage and a clock frequency to be supplied. To perform such control properly, sequence and timing are important and customized on a per-product basis. This poses a problem that a period required for verification, TAT (Turn Around Time), is long in designing a system controlling circuit. Moreover, specifications that sequence and timing should meet may be restricted or changed due to coordination with other parts which are externally coupled to the LSI. Therefore, in an initial phase of developing a system controlling circuit, determining specifications tends to delay in comparison with other functional blocks. In a later phase of its development, specification change of parts which are externally coupled gives rise to re-verification of some verification items or additional verification items. Consequently, these things would be a cause of elongating the TAT of developing the entire chip. Along with an increasing need to decrease the power consumption of LSI in late years, there is a tendency in which a system controlling circuit is required to adapt to specifications for more elaborate control. Thus, a programmable specification change technique is needed for a system controlling circuit.

In Japanese Published Unexamined Patent Application No. 2013-89060, a start-up sequence controlling device for a power supply system is disclosed. The start-up sequence controlling device includes an analog-digital converter that converts a voltage value which is input from a terminal into a digital value and a register that retains a converted digital value and controls a power supply circuit according to start-up sequence or shutdown sequence which is determined by a digital value retained in the register.

SUMMARY

Investigation on Japanese Published Unexamined Patent Application No. 2013-89060, made by the present inventors, revealed that there is an emerging problem as below.

The start-up sequence controlling device described in Japanese Published Unexamined Patent Application No. 2013-89060 can select a specified sequence from among a plurality of sequences, according to digital data stored in the register; e.g., 8-bit data can give 256 combinations (paragraph 0023 in the same document). In fact, a gamut of selectable sequences has to be predefined and change to a sequence out of the gamut cannot be made. Therefore, in a situation where adapting to specifications for more elaborate control is required, as noted previously, the number of selectable sequences which should be predefined becomes huge and the development TAT for relevant specification decision elongates. This entails a long period for relevant verification and, moreover, unexpected specification change, if occurs, could further elongate the TAT.

To solve such a problem, a configuration with a plurality of registers which can be set freely from a CPU (Central Processing Unit) or the like may be a good idea. However, it was found that mounting a CPU gives rise to a security problem. Especially, in start-up sequence, because supply of a power supply, clock, and reset to plural functional blocks is started concurrently or serially for the blocks, it is anticipated that there is a high risk of creating a security hole. It was found that a CPU operating under such an environment is exposed to a high risk that the CPU is taken over by a third party having a wrongful purpose. It was also found that, because a system controlling circuit is a key element that exerts an overall control of LSI, influence on it when it is taken over fraudulently is extremely large. In this regard, the number of registers is not matter and, even if there is a single register, when a configuration is made so that the register can be set freely from an external CPU or the like, the same problem occurs.

It was found that, as described above, only the provision of registers which can be set from a CPU or the like to make a system controlling circuit adaptable to programmable specification change gives rise to a new problem of creating a security risk.

While a means for solving such a problem is described below, other problems and novel features will be apparent from description provided herein and attached drawings.

A semiconductor integrated circuit according to one embodiment is as described below.

A semiconductor integrated circuit including functional blocks and a system controlling circuit is configured as below. The system controlling circuit includes a programmable timing controller and a second boot programmable sequencer and supplies a group of system control signals including at least one of a power supply control signal, reset signal, and clock signal to the functional blocks. In the system controlling circuit, the programmable timing controller adjusts either or both of sequence and timing of supplying the group of system control signals to the functional blocks based on parameters supplied thereto and the second boot programmable sequencer reads in encrypted sequence code and data, decrypts them, and supplies the programmable timing controller with the parameters in accordance with decrypted sequence code and data.

An advantageous effect that is obtained by the foregoing one embodiment is briefly described below.

It is possible to make a system controlling circuit adaptable to programmable specification change through parameters under a secure environment that is tamper resistant.

DETAILED DESCRIPTION

Embodiments will now be described in detail. In all the drawings for describing the embodiments for carrying out the invention, elements having a same function are assigned the same referential numeral and their repeated description is omitted.

First Embodiment

<Specification Change of a System Controlling Circuit by a Secure Second Boot Programmable Sequencer>

Figure 1:
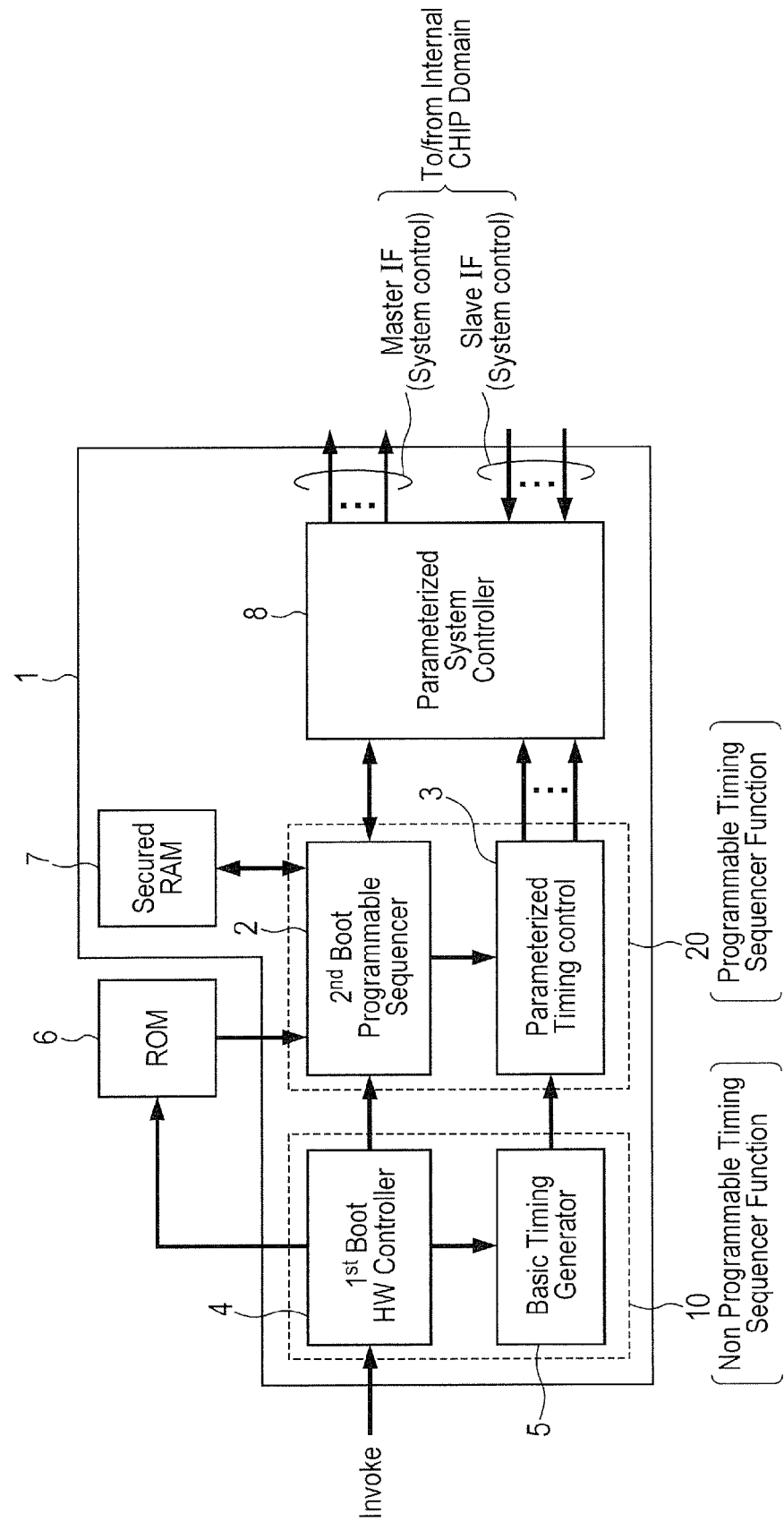
FIG. 1 is a block diagram depicting an example of configuration of a system controlling circuit of a first embodiment.

FIG. 1 is a block diagram depicting an example of configuration of a system controlling circuit 1 of a first embodiment. A semiconductor device having the system controlling circuit 1 mounted on board is, for example, a System on Chip (SoC) LSI including one or plural internal chip domains (Internal CHIP Domain), each of which is comprised of plural functional blocks including plural CPUs. Although not restrictive, such a semiconductor device is formed over a single semiconductor substrate such as a silicon substrate, using Complementary Metal Oxide Semiconductor LSI fabrication technology which is publicly known. Signals which are represented in FIG. 1 are digital signals ranging from one bit to multiple bits and each signal line is comprised of one or plural lines of wiring, but bus representation is omitted. These are also true for other embodiments which are disclosed in the present application and other block diagrams which are cited.

The system controlling circuit 1 is started up by a start-up signal Invoke, such as reset which is input from outside of the chip or power-on reset which is generated by sensing power-on, and supplies a group of system control signals Master IF to an internal chip domain. The Master IF is a group of signals including at least one of a power supply control signal, a reset signal, and a clock signal. A status signal Slave IF which indicates relevant status may be fed back from the internal chip domain. The status signal Slave IF may be any information relevant to sequence control on power supply voltage control, reset, and clock sequences, such as, e.g., status of stability of a power supply voltage and a clock signal, status of computational load of a CPU among others, hibernation status, and occurrence of an error that would be attributed to an attack from outside. Here, hibernation status is, for example, status information such as ready/busy/done in a case where, inter alia, saving data to a register before transition into a standby mode is performed.

The system controlling circuit 1 includes a first boot HW controller 4, a basic timing generator 5, a second boot programmable sequencer 2, and a programmable timing controller (or Parameterized Timing Controller) 3. The second boot programmable sequencer 2 is coupled to a Read Only Memory (ROM) 6 and has a secured RAM 7 internal to it. The ROM 6 is, for example, a flash memory which is included in the system controlling circuit 1 and which may be mounted on board as another functional block on the same chip or attached to the chip externally. Encrypted sequence code and data are stored in the ROM 6. The secured RAM 7 is a Random Access Memory (RAM) provided with tamper resistance by a publicly known security technique such as restricting what can access it to the second boot programmable sequencer 2. According to the start-up signal Invoke, the first boot HW controller 4 supplies, inter alia, a power supply control signal, reset signal, and clock signal to the basic timing generator 5, ROM 6, and second boot programmable sequencer 2. The basic timing generator 5 is activated by the first boot HW controller 4 and supplies primary signals, such as a power supply control signal, reset signal, and clock signal, to the programmable timing controller 3. The second boot programmable sequencer 2, when it is activated by a signal supplied from the first boot HW controller 4, reads in encrypted sequence code and data from the ROM 6, decrypts them, and stores decrypted sequence code and data into the secured RAM 7. The second boot programmable sequencer 2 is a sequencer that operates in accordance with decrypted sequence code and sets parameters for the programmable timing controller 3 according to decrypted data. The programmable timing controller 3 is provided with a resister into which parameters are written and controls timing to start and timing to stop the supply of, inter alia, a power supply control signal, reset signal, and clock signal.

The first boot HW controller 4 and the basic timing generator 5 provide a non-programmable timing sequencer function 10, essentially excluding programmable elements for which parameters can be set. On the other hand, the second boot programmable sequencer 2 and the programmable timing controller 3 provide a programmable timing sequencer function 20, incorporating a number of programmable elements for which parameters can be set to enable flexible adaptation to specification change. The present system controlling circuit 1 executes booting the semiconductor device in which it is included in two phases: first booting with the non-programmable timing sequencer function 10 and second booting with the programmable timing sequencer function 20. The non-programmable timing sequencer function 10 is robust against an attack from outside, such as takeover, because it excludes programmable elements. On the other hand, the programmable timing sequencer function 20 has high tamper resistance, even though including programmable elements, because sequence code and data are encrypted and stored in the ROM 6 and retained in the secured RAM 7 after being decrypted. Thus, the entire function of the system controlling circuit 1 is hierarchized in two levels: the non-programmable timing sequencer function 10 that is inherently robust against an attack from outside, such as takeover, and the programmable timing sequencer function 20 that has tamper resistance by protecting programmable elements through encryption and the secured RAM 7. Thereby, the system controlling circuit can be made adaptable to programmable specification change through parameters under a secure environment that is tamper resistant.

The system controlling circuit 1 may further include a parameterized system controller 8. The parameterized system controller 8 is a sequencer that is controlled by, inter alia, a start-up command from the second boot programmable sequencer 2 or is set up with parameters. The parameterized system controller 8 takes input of, inter alia, a power supply control signal, reset signal, and clock signal whose primary timing was controlled by the programmable timing controller 3, takes input of a status signal Slave IF from an internal chip domain, and supplies a group of system control signals Master IF to the internal chip domain. Supplied from the programmable timing controller 3 are, inter alia, a power supply control signal, reset signal, and clock signal which are primary signals, only having undergone a booting sequence. The parameterized system controller 8 controls an internal chip domain according to a status signal Slave IF which is input from the internal chip domain and supplies the internal chip domain with a group of system control signals Master IF whose sequence has been controlled more highly.

As described previously, a status signal Slave IF may signal, for example, status of stability of a power supply voltage and a clock signal, status of computational load of a CPU among others, hibernation status (e.g., ready/busy/done), or occurrence of an error that would be attributed to an attack from outside. For instance, once it has been made sure that power supply and clock are stable by a signal indicating the status of stability of a power supply voltage and a clock signal, which is included in a status signal Slave IF, a reset signal is input. For instance, when an error that would be attributed to an attack from outside occurs, indicated by a signal which is included in a status signal Slave IF, the power supply to a functional block that is attacked is shut down after hibernation is performed. Additionally, for instance, an adjustment is made of a power supply voltage and a clock frequency according to the status of computational load of a CPU among other which is included in a status signal Slave IF. Thus, by providing the parameterized system controller 8, diversified sophisticated sequence control would become possible. Besides, because the parameterized system controller 8 is controlled by the second boot programmable sequencer 2, its tamper resistance is maintained.

Figure 2:
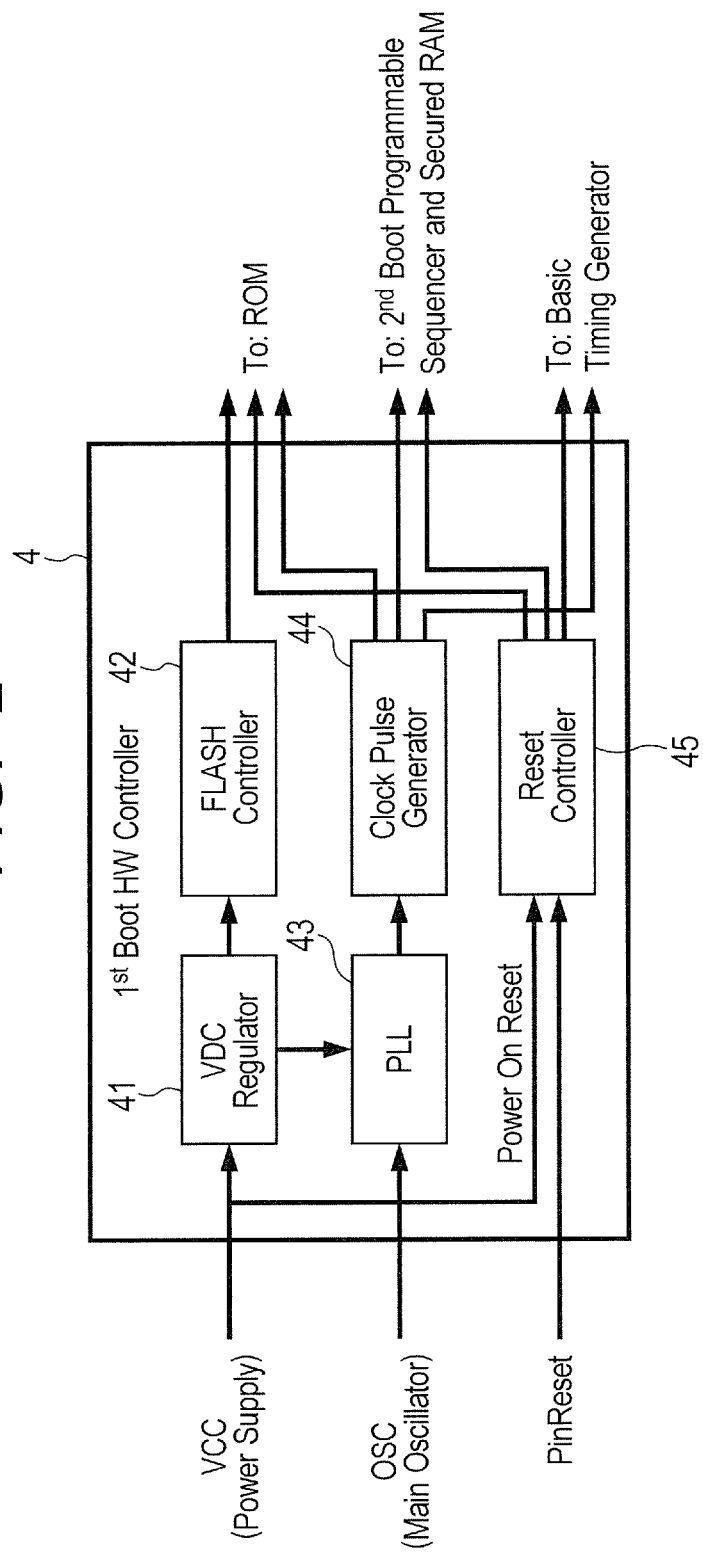
FIG. 2 is a block diagram depicting an example of configuration of a first boot HW controller.

FIG. 2 is a block diagram depicting an example of configuration of the first boot HW controller 4. As described previously, the first boot HW controller 4 is a circuit that supplies, inter alia, a power supply control signal, reset signal, and clock signal to the basic timing generator 5, ROM 6, and second boot programmable sequencer 2. As is illustrated, the first boot HW controller 4 includes a VDC Regulator 41, a FLASH controller 42, a PLL (Phase Locked Loop) 43, a clock pulse generator 44, and a reset controller 45. An external power supply VCC is supplied to the VDC regulator 41, decreased to a predetermined voltage and stabilized, and supplied to the FLASH controller 42 and PLL 43. The stabilized power supply may also be supplied from the VDC regulator to another circuit including the clock pulse generator 44 and reset controller 45 as well as respective circuits located outside of the first boot HW controller 44; this is, however, omitted from depiction. When the ROM 6 is a flash memory, the FLASH controller 42 generates and supplies various control signals accordingly. A primary clock signal is input from a main oscillator OSC to the PLL 43 where the clock frequency is multiplied or divided and its output clock is supplied to the clock pulse generator 44; clock signals with different frequencies are thus generated. Generated various clock signals are supplied to, inter alia, the ROM 6, second boot programmable sequencer 2, secured RAM 7, and basic timing generator 5. A reset PinReset which is input from outside of the chip and a Power On Reset signal which is generated by sensing power-on of the power supply VCC are input to the reset controller 45 and distributed to, inter alia, the ROM 6, second boot programmable sequencer 2, secured RAM 7, and basic timing generator 5 as a reset signal for each element.

Figure 3:
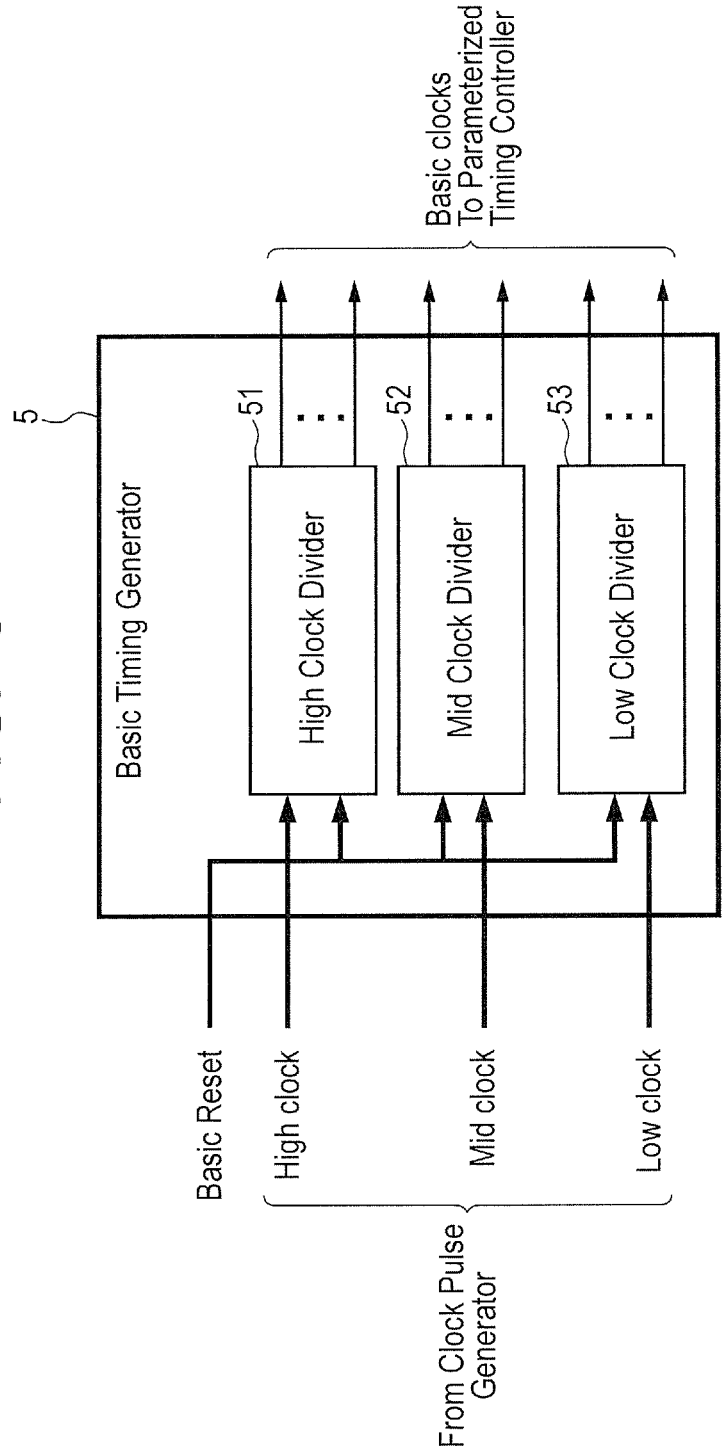
FIG. 3 is a block diagram depicting an example of configuration of a basic timing generator.

FIG. 3 is a block diagram depicting an example of configuration of the basic timing generator 5. The basic timing generator 5 includes three different clock dividers (high, mid, and low clock dividers) 51, 52, 53 which handle, for example, clock signals having three different frequencies respectively: High Clock, Mid Clock, and Low Clock. To the basic timing generator 5, clock signals with three different frequencies, High Clock, Mid Clock, and Low Clock are supplied from the clock pulse generator 44 within the first boot HW controller 4 and a primary reset signal Basic Reset is supplied from the reset controller 45. A high clock divider 51 divides the frequency of a clock signal with a high frequency and supplies its output clock as one of basic clocks to the programmable timing controller 3. Likewise, a mid clock divider 52 and a low clock divider 53 respectively divide the frequencies of a clock with a middle frequency Mid Clock and a clock with a low frequency Low Clock and supply their output clocks as a subset of basic clocks to the programmable timing controller 3. Here, for example, the clock signal with a high frequency High Clock ranges from several hundred MHz to several GHz to be supplied to the CPU. The clock with a middle frequency Mid Clock ranges from several MHz to Several hundred MHz to be supplied to a bus having a heavy load and peripheral functional modules. The clock with a low frequency Low Clock ranges from several Hz to several hundred kHz to be supplied to functional blocks whose minimum operation should be guaranteed in standby mode, such as a clock (real time clock) block. However, three different frequencies mentioned as clock frequencies are only exemplary and clock dividers may be provided to handle any number of different frequencies and particular frequency values are not limited to those mentioned above and may be selected appropriately.

Figure 4:
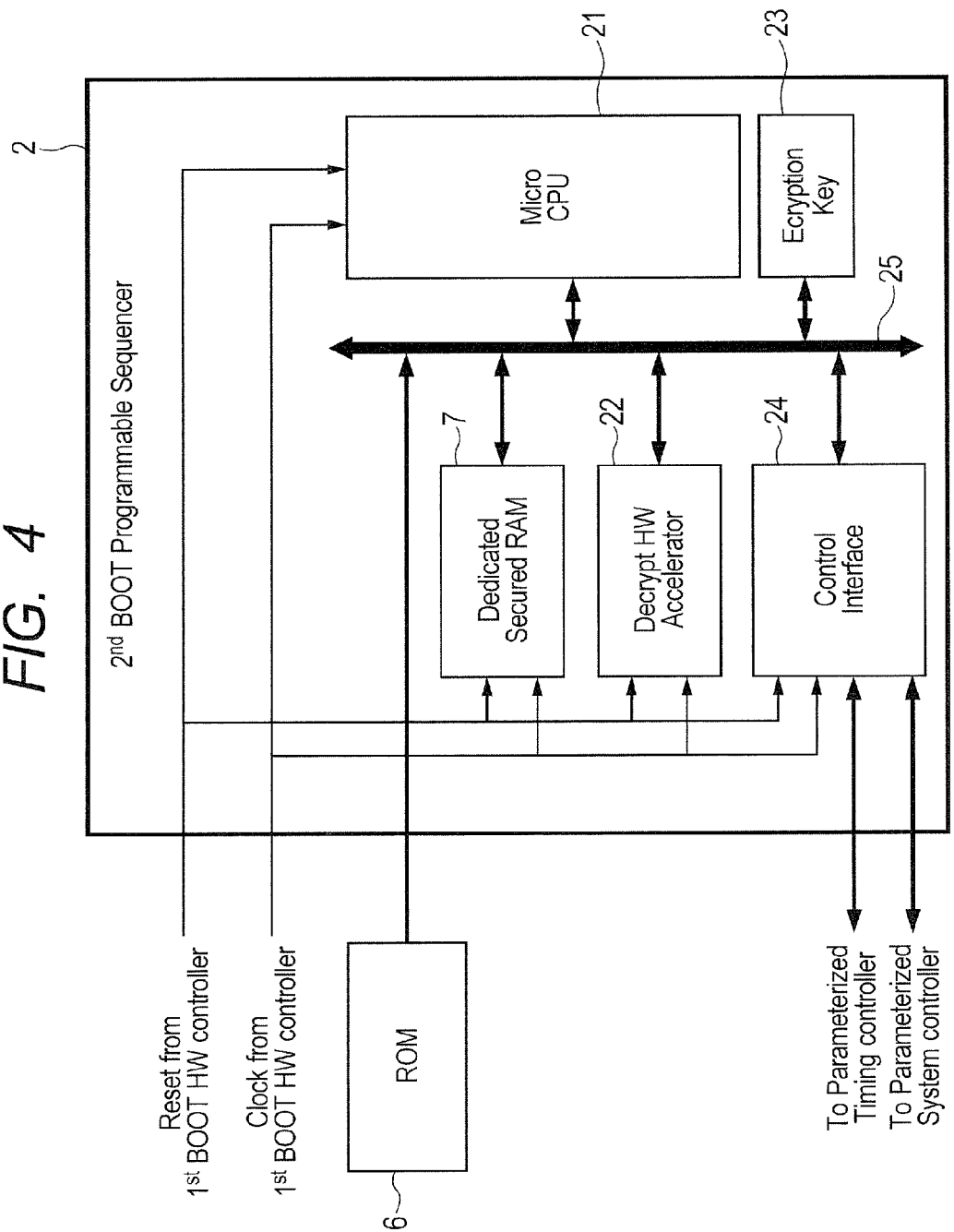
FIG. 4 is a block diagram depicting an example of configuration of a second boot programmable sequencer.

FIG. 4 is a block diagram depicting an example of configuration of the second boot programmable sequencer 2. By way of example, the second boot programmable sequencer 2 is configured including a micro CPU 21, a decrypt HW accelerator 22, an encryption key storing circuit 23, a control interface 24, and a secured RAM 7 which are coupled to an internal bus 25. Although an example in which the secured RAM 7 is externally attached to the second boot programmable sequencer 2 was illustrated in FIG. 1, a dedicated secured RAM 7 is incorporated in the second boot programmable sequencer 2 in FIG. 4. On the other hand, the ROM 6 is not incorporated in the second boot programmable sequencer 2 and externally attached as is the case for FIG. 1. To the micro CPU 21, decrypt HW accelerator 22, control interface 24, and secured RAM 7, a primary reset signal Reset and a clock signal Clock are input from the first boot HW controller 4. In the encryption key storing circuit 23, an encryption key is stored in a state where tamper resistance has been assured. Encrypted sequence code and data (Encrypted Code/Data) which are stored in the ROM 6 are read from the ROM 6 and transferred to the decrypt HW accelerator 22 via the bus 25. Using the encryption key stored in the encryption key storing circuit 23, the decrypt HW accelerator 22 decrypts the encrypted data which has been read from the ROM 6 and stores decrypted sequence code and data into the secured RAM 7. Sequence code is, for example, instructions which are included in an instruction set for a Reduced Instruction Set Computer (RISC) and the micro CPU 21 can be implemented as an RSIC processor which is able to execute this instruction set. The micro CPU 21 reads sequence code from the secured RAM 7 and fetches, decodes, and executes such code. This instruction set should preferably be comprised only of very simple instructions. For instance, data is read from the secured RAM 7 and transferred as parameters directly to the programmable timing controller 3 and parameterized system controller 8 via the control interface 24 or given to set or reset registers provided in the programmable timing controller 3 and parameterized system controller 8. Besides, for instance, data is read from the secured RAM 7 and a control signal is generated based on such data to control the programmable timing controller 3 and parameterized system controller 8. Instead of providing the decrypt HW accelerator 22 as is illustrated in FIG. 4, encrypted data may be decrypted by software running on the micro CPU 21 in an alternative configuration.

Figure 5:
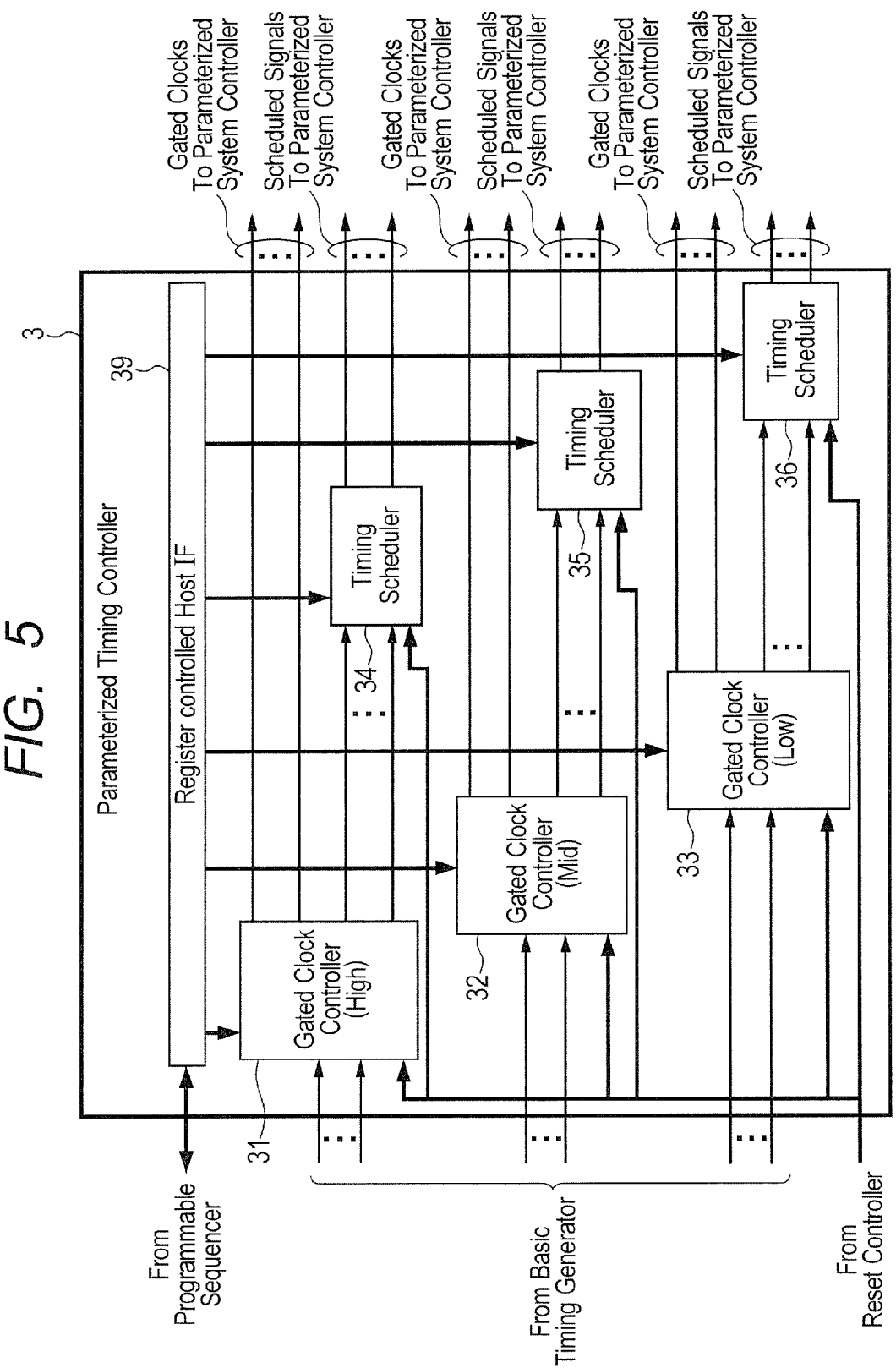
FIG. 5 is a block diagram depicting an example of configuration of a programmable timing controller.

FIG. 5 is a block diagram depicting an example of configuration of the programmable timing controller 3. By way of example, the programmable timing controller 3 includes a register controlled host IF 39, gated clock controllers 31, 32, 33, and timing schedulers 34, 35, 36. The register controlled host IF 39 is provided with registers for storing parameters which are set and transferred from the second boot programmable sequencer 2 and controls the gated clock controllers 31, 32, 33 and timing schedulers 34, 35, 36. The gated clock controllers 31, 32, 33 are circuits that control the supply and stop of a clock signal to an internal chip domain at a point near to the root of a clock tree for distributing clock signals across the semiconductor device. By stopping the supply of a clock signal to an internal chip domain that is deactivated, power consumption of the internal chip domain can be suppressed. In addition, by gating at a point as near as possible to the root, power that is consumed by the clock tree can be suppressed. To the gated clock controllers 31, 32, 33, basic clocks respectively corresponding to the clock signals with three different frequencies, High Clock, Mid Clock, and Low Clock which are supplied from the basic timing generator 5 are input. The gated clock controllers 31, 32, 33 are dedicated respectively for the clock signals with three different frequencies, High Clock, Mid Clock, and Low Clock, controlled by the register controlled host IF 39, output gated clocks corresponding to the respective frequencies, and supply the gated clocks to the timing schedulers 34, 35, 36, and the parameterized system controller 8. The timing schedulers 34, 35, 36 are also dedicated respectively for the clock signals with three different frequencies, High Clock, Mid Clock, controlled by the register controlled host IF 39, output scheduled control signals (Scheduled Signals) corresponding to the respective frequencies, and supply these signals to the parameterized system controller 8.

Figure 6:
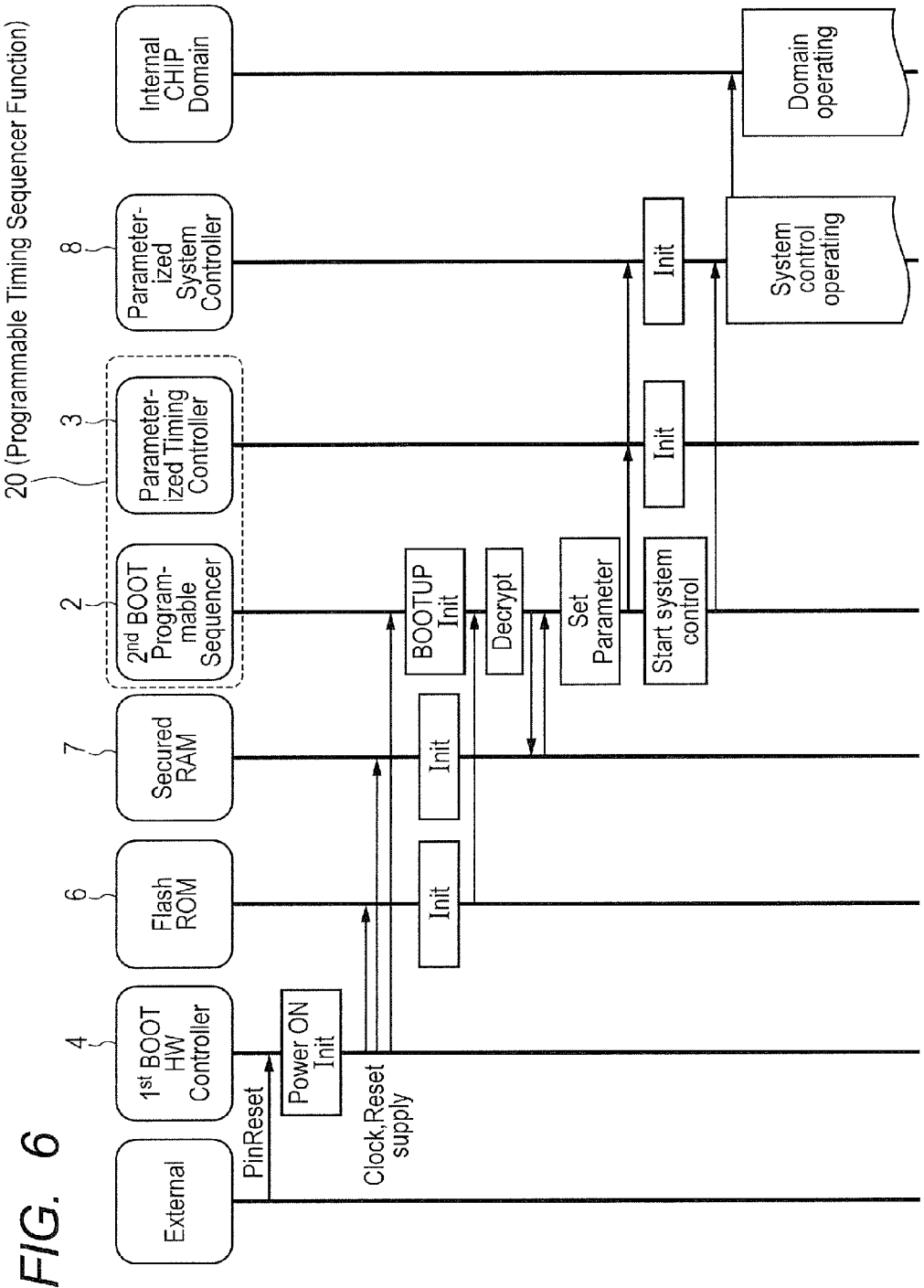
FIG. 6 is a flow diagram depicting an example of operation of the system controlling circuit of the first embodiment.

FIG. 6 is a flow diagram depicting an example of operation of the system controlling circuit 1 of the first embodiment. The respective elements involved in the operation of the system controlling circuit 1 are placed laterally and a time axis is presented vertically. However, the time axis is not quantitative and only represents sequence in which events occur.

When PinReset is input from outside (External), the first boot HW controller 4 initializes power-on reset (Power On Init), supplies a clock signal and a reset signal to the ROM 6, secured RAM 7, and second boot programmable sequencer 2, and resets and releases these elements. The ROM 6 and secured RAM 7 are initialized (Init) and the second boot programmable sequencer 2 is booted up (BOOTUP Init).

Then, the second boot programmable sequencer 2 reads encrypted sequence code and data (code/data) from the initialized ROM 6, decrypts them securely (Decrypt), and writes those decrypted into the secured RAM 7. However, firmware to be encrypted may be minimized enough to meet the requirement for ensuring its safety, taking, inter alia, the amount of memory used by it into consideration.

Next, the second boot programmable sequencer 2 reads the decrypted sequence code and data from the secured RAM 7 and executes the firmware, thereby setting parameters (Set Parameter) for, e.g., sending a start-up command to the programmable timing controller 3, followed by initializing (Init) the programmable timing controller 3 and initializing (Init) the parameterized system controller 8.

Next, the second boot programmable sequencer 2 further executes the firmware, thereby starting system control over the parameterized system controller 8 (Start System Control). Then, the parameterized system controller 8 starts system control operation (System Control Operating) and an internal chip domain (Inter CHIP Domain) starts to operate (Domain Operating).

As described above, according to the system controlling circuit 1 of the present first embodiment, it is possible to adapt to start-up sequence and system control timing customized for each semiconductor device by only rewriting sequence code and data in the ROM 6. When doing so, firmware and parameters that made it possible to rewrite code in the ROM 6 are protected by being encrypted and a secure system is provided. Booting is hierarchized in two levels and the second boot programmable sequencer 2 dedicated for second booting is provided. Thus, a common scheme for parameter setting is provided, independent of product level specifications of semiconductor devices. By providing the second boot programmable sequencer 2 dedicated for second booting, it is possible to flexibly manage the system controlling circuit. For instance, in response to an elaborate control scheme required for low power consumption, it is possible to execute stopping a domain including a CPU that does not need to operate, as a whole, and eventually shutting down the power supply to that domain. It is also possible to shut down the power supply to all CPUs that do not need to operate upon the initial power-on and later. For microcomputer products, for example, scalable specifications from low-end products with limited functions to high-end products equipped with all possible functions can be developed and a design TAT problem involved during such development is resolved. An elaborate control scheme that can be implemented not only resolves a design TAT problem, also makes it possible to include a low-power system under optimal conditions for customer's application by providing such control scheme to customers.

Second Embodiment

<Second Boot Programmable Sequencers for each Domain>

It is often the case that a single-chip semiconductor device is divided into plural domains and the management of power supply and clock is performed on the per-domain basis. In each domain, plural functional blocks which are controlled in a common manner are included. In cases where more elaborate control is implemented, one functional block may form one domain and, besides, only a part of one functional block may form one domain or respective parts of plural functional blocks may be assembled to form one domain. In a case where a semiconductor device is comprised of plural domains as above, it is more preferable to configure the system controlling circuit 1 accordingly.

Figure 7:
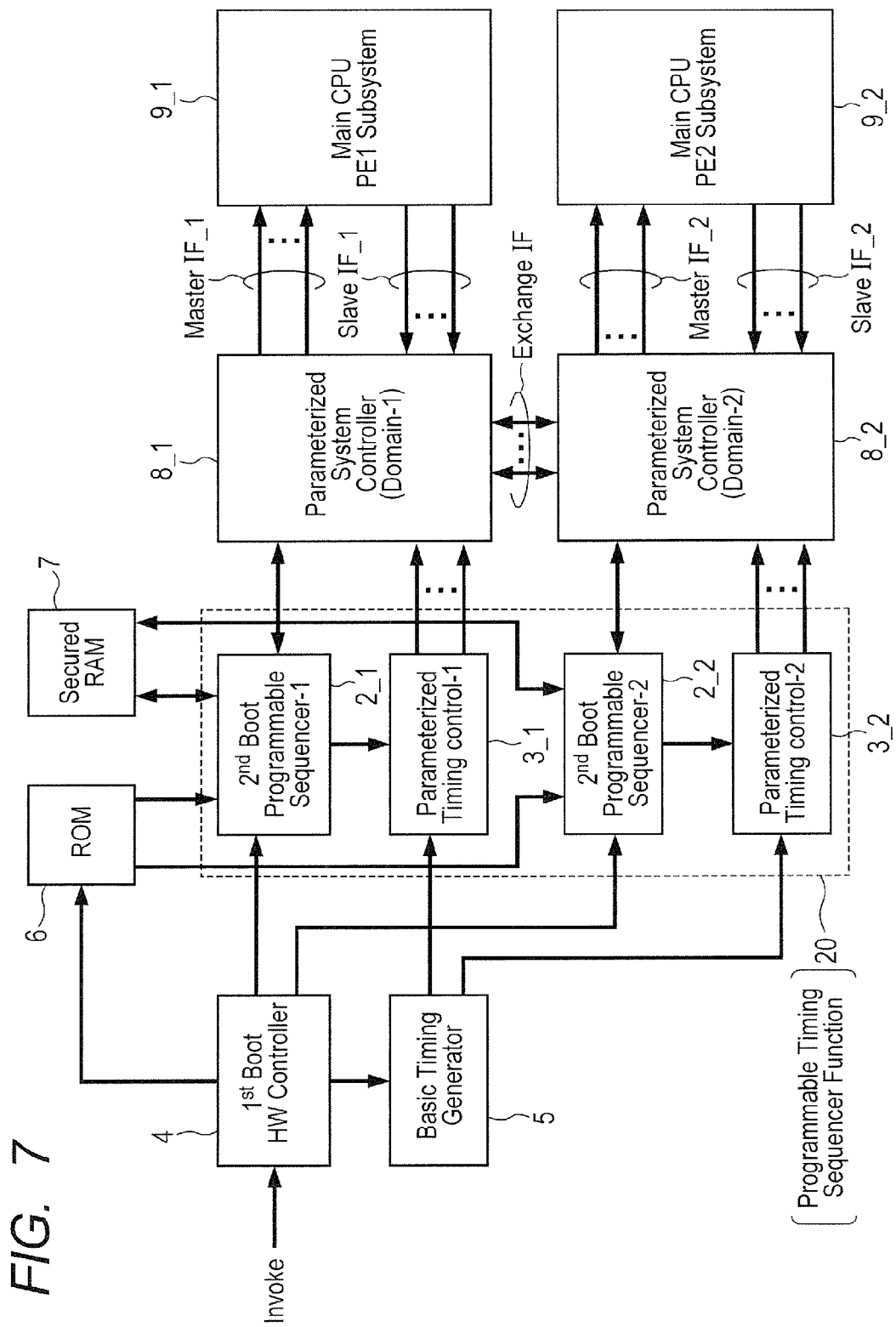
FIG. 7 is a block diagram depicting an example of configuration of a system controlling circuit of a second embodiment.

FIG. 7 is a block diagram depicting an example of configuration of a system controlling circuit of a second embodiment. A semiconductor device having the system controlling circuit 1 mounted on board has, e.g., two CPUs which are located in independent domains 9_1 and 9_2 respectively. A domain 9_1 is a subsystem that is run by a main CPU_PE1 (Main CPU PE1 Subsystem) and a domain 9_2 is a subsystem that is run by a main CPU_PE2 (Main CPU PE2 Subsystem).

The system controlling circuit 1 is started up by a start-up signal Invoke, such as reset which is input from outside of the chip or power-on reset which is generated by sensing power-on, and supplies groups of system control signals Master IF_1 and Master IF_2 to the domains 9_1 and 9_2 respectively. Each of Master IF_1 and Master IF_2 is a group of signals including at least one of a power supply control signal, a reset signal, and a clock signal. From the domains 9_1 and 9_2, status signals Slave IF_1 and Slave IF_2, each of which indicates relevant status, are fed back to parameterized system controllers 8_1 and 8_2 respectively.

As is the case for FIG. 1, the system controlling circuit 1 includes a first boot HW controller 4, a basic timing generator 5, and a secured RAM 7 and a ROM 6 is externally attached thereto or incorporated therein, but what differs is that it includes two second boot programmable sequencers 2_1 and 2_2, two programmable timing controllers 3_1 and 3_2, and two parameterized system controllers 8_1 and 8_2 which are dedicated respectively for the domains. Moreover, the two parameterized system controllers 8_1 and 8_2 are provided with an interface Exchange IF for exchanging domain data with each other. The ROM 6 stores encrypted sequence code and data for the second boot programmable sequencer 2_1 and encrypted sequence code and data for the second boot programmable sequencer 2_2 and is accessible from both the second boot programmable sequencers 2_1 and 2_2. The secured RAM 7 is configured so that it is also accessible from both the second boot programmable sequencers 2_1 and 2_2 and can store decrypted sequence code and data for the second boot programmable sequencer 2-1 and for the second boot programmable sequencer 2_2. Instead of this configuration in which the RAM is shared, the second boot programmable sequencers 2_1 and 2_2 may be provided with dedicated secured RAMs respectively. The configuration in which the RAM is shared, as is depicted, can increase the layout efficiency of the secured RAM 7 and, therefore, the chip area can be saved. On the other hand, if the second boot programmable sequencers 2_1 and 2_2 are provided with dedicated secured RAMs respectively, no access contention occurs and, therefore, arbitration is not required, thus leading to an increase in access speed.

According to the start-up signal Invoke, the first boot HW controller 4 supplies, inter alia, a power supply control signal, reset signal, and clock signal to the basic timing generator 5, ROM 6, and second boot programmable sequencers 2_1 and 2_2. The basic timing generator 5 is activated by the first boot HW controller 4 and supplies primary signals, such as a power supply control signal, reset signal, and clock signal, to the programmable timing controllers 3_1 and 3_2. The second boot programmable sequencer 2_1, when it is activated by a signal supplied from the first boot HW controller 4, reads in encrypted sequence code and data from the ROM 6, decrypts them, and stores decrypted sequence code and data into the secured RAM 7. Each of the second boot programmable sequencers 2_1 and 2_2 may perform decryption of encrypted sequence code and data. The second boot programmable sequencers 2_1 and 2_2 each perform sequence operation in accordance with the decrypted sequence code and data and perform parameter setting and control for the programmable timing controllers 3_1 and 3_2 respectively. The second boot programmable sequencer 2_1 and the programmable timing controller 3_1 control the sequence of, inter alia, power supply control signal, reset signal, and clock signal for the domain 9-1 via the parameterized system controller 8_1. The second boot programmable sequencer 2_2 and the programmable timing controller 3_2 control the sequence of, inter alia, power supply control signal, reset signal, and clock signal for the domain 9-2 via the parameterized system controller 8_2. How each controls the sequence is the same as for the first embodiment and, therefore, its description is omitted. Fundamentally, control of the domain 9_1 and control of the domain 9_2 can be performed independently. When control of one domain depends on the state of the other domain, a status signal relevant to it is sent and received via the interface Exchange IF.

Although an example in which there are two domains is depicted here, the number of domains is arbitrary. In a case where the semiconductor device has plural domains within the same chip as above, the system controlling circuit 1 can be configured scalably by providing the system controlling circuit 1 with sets of the second boot programmable sequencer 2, programmable timing controller 3, and parameterized system controller 8 and assigning one set for each of the domains.

Figure 8:
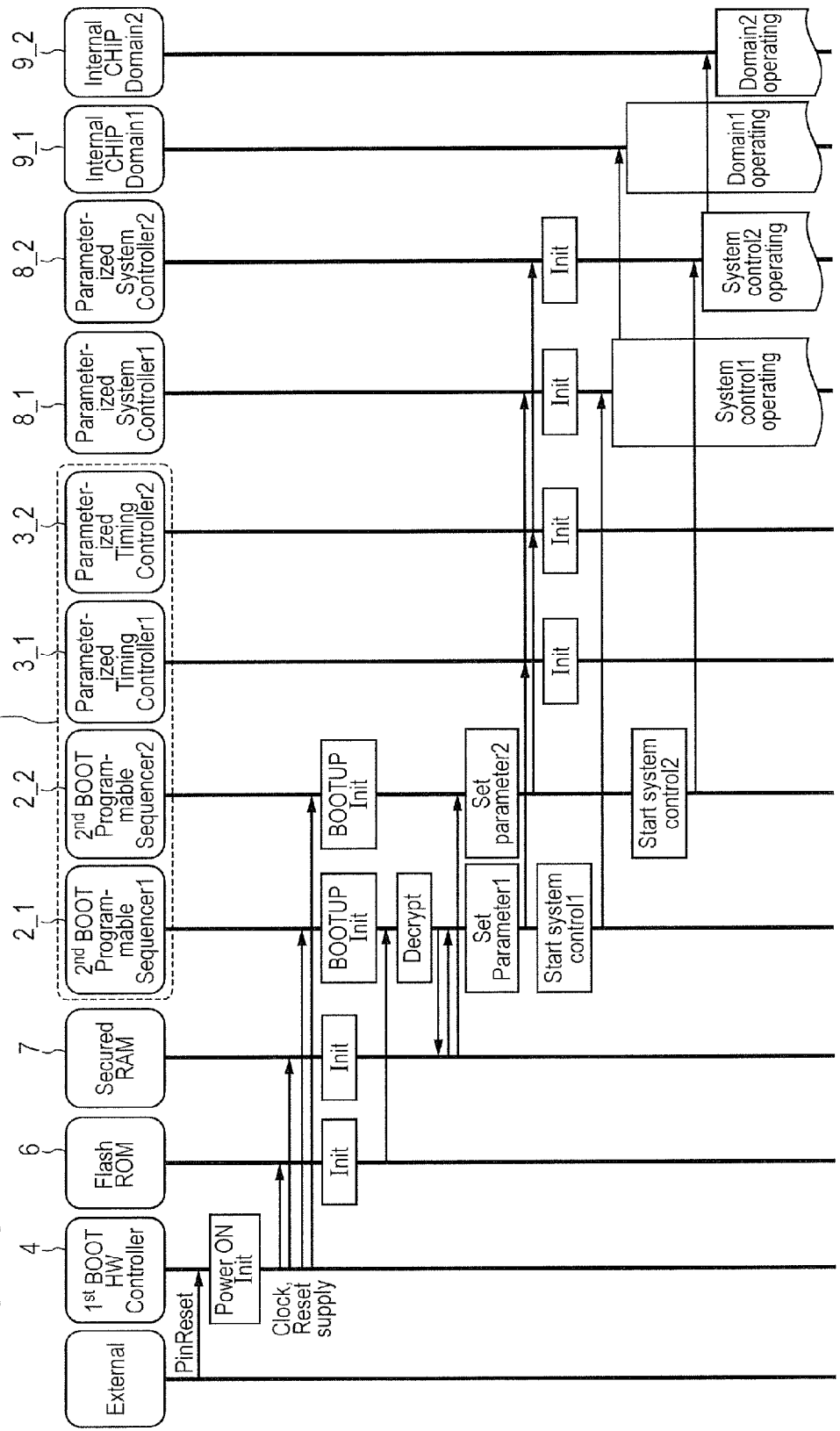
FIG. 8 is a flow diagram depicting an example of operation of the system controlling circuit of the second embodiment.

FIG. 8 is a flow diagram depicting an example of operation of the system controlling circuit 1 of the second embodiment. As is the case for FIG. 6, the respective elements involved in the operation of the system controlling circuit 1 are placed laterally and a time axis is presented vertically. However, the time axis is not quantitative and only represents sequence in which events occur.

When PinReset is input from outside (External), the first boot HW controller 4 initializes power-on reset (Power On Init), supplies a clock signal and a reset signal to the ROM 6, secured RAM 7, and second boot programmable sequencers 2_1 and 2_2, and resets and releases these elements. The ROM 6 and secured RAM 7 are initialized (Init) and the second boot programmable sequencers 2_1 and 2_2 are each booted up (BOOTUP Init).

Then, the second boot programmable sequencer 2_1 reads encrypted sequence code and data (code/data) from the initialized ROM 6, decrypts them securely (Decrypt), and writes those decrypted into the secured RAM 7. The second boot programmable sequencers 2_1 and 2_2 may each read and decrypt sequence code and data concurrently and write decrypted sequence code and data into the secured RAM 7.

Next, the second boot programmable sequencers 2_1 and 2_2 each read the decrypted sequence code and data from the secured RAM 7 and execute the firmware for a domain to be handled by each. By executing the firmware, the second boot programmable sequencers 2_1 and 2_2 each set parameters (Set Parameter) for, e.g., sending a start-up command to the programmable timing controllers 3_1 and 3_2, followed by initializing (Init) the programmable timing controllers 3_1 and 3_2 respectively and initializing (Init) the parameterized system controllers 8_1 and 8_2 respectively.

Next, the second boot programmable sequencers 2_1 and 2_2 further execute the firmware for a domain to be handled by each, thereby starting system control over the parameterized system controllers 8_1 and 8_2 respectively (Start System Control). Then, the parameterized system controllers 8_1 and 8_2 each start system control operation (System Control Operating) and the domains 9_1 and 9_2 each start to operate (Domain Operating). Although it is depicted that the domains 9_1 and 9_2 appear to start to operate at different points of time, this is simply for the purpose of avoiding confusion in depiction and either of the domains may start to operate earlier or both the domains may start to operate at the same time.

As described above, according to the system controlling circuit 1 of the second embodiment, when an LSI having plural domains is configured, the system controlling circuit can be configured scalably and a design TAT problem is resolved. Furthermore, by making the number of processor elements PEs scalable and assigning each individual processor element PE to one domain, it is possible to implement control such as stopping a clock and shutting down the power supply for each processor element PE and, therefore, the effect of reducing power consumption is significant.

Third Embodiment

<Second Boot Programmable Sequencer Common for Plural Domains>

In the second embodiment, in a case where the semiconductor has plural domains within the same chip, the system controlling circuit 1 is configured scalably by providing the system controlling circuit 1 with sets of the second boot programmable sequencer 2, programmable timing controller 3, and parameterized system controller 8 and assigning one set for each of the domains. Alternatively, it is possible that a second boot programmable sequencer 2 and a programmable timing controller 3 are provided so as to be common for plural domains to perform control that is common for these domains and parameterized system controllers 8 are provided for each domain to perform control specific to each domain.

Figure 9:
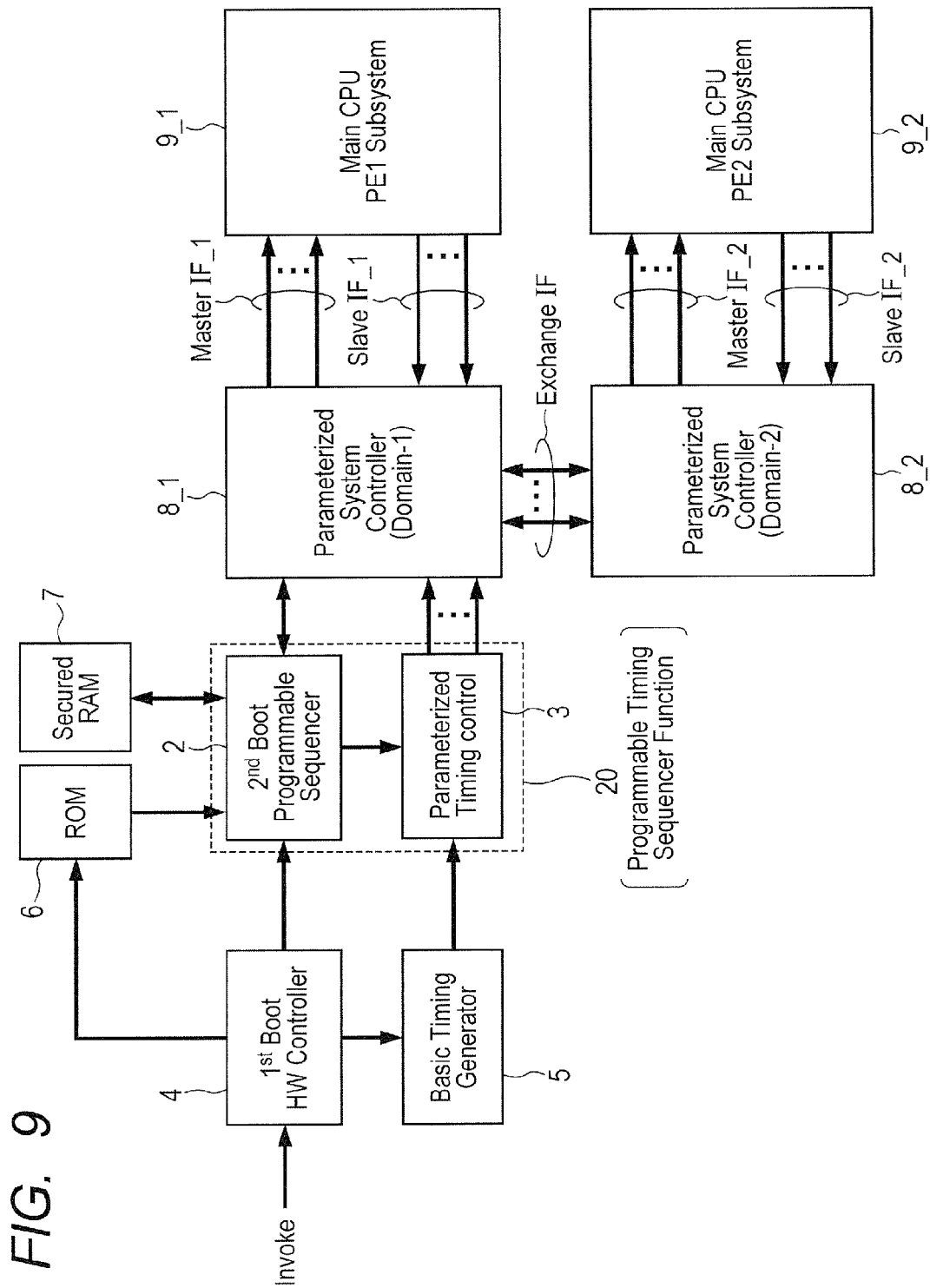
FIG. 9 is a block diagram depicting an example of configuration of a system controlling circuit of a third embodiment.

FIG. 9 is a block diagram depicting an example of configuration of a system controlling circuit 1 of a third embodiment. A semiconductor device having the system controlling circuit 1 mounted on board has, e.g., two CPUs which are located in independent domains 9_1 and 9_2 respectively. A domain 9_1 is a subsystem that is run by a main CPU_PE1 (Main CPU PE1 Subsystem) and a domain 9_2 is a subsystem that is run by a main CPU_PE2 (Main CPU PE2 Subsystem).

The system controlling circuit 1 is started up by a start-up signal Invoke, such as reset which is input from outside of the chip or power-on reset which is generated by sensing power-on, and supplies groups of system control signals Master IF_1 and Master IF_2 to the domains 9_1 and 9_2 respectively. Each of Master IF_1 and Master IF_2 is a group of signals including at least one of a power supply control signal, a reset signal, and a clock signal. From the domains 9_1 and 9_2, status signals Slave IF_1 and Slave IF_2, each of which indicates relevant status, are fed back to parameterized system controllers 8_1 and 8_2 respectively.

As is the case for FIG. 7, the system controlling circuit 1 includes a first boot HW controller 4, a basic timing generator 5, and a secured RAM 7 and a ROM 6 is externally attached thereto or incorporated therein. In the second embodiment depicted in FIG. 7, the system controlling circuit 1 includes two second boot programmable sequencers 2_1 and 2_2, two programmable timing controllers 3_1 and 3_2, and two parameterized system controllers 8_1 and 8_2 which are dedicated respectively for the domains. For the present third embodiment, what differs from the second embodiment is that the system controlling circuit 1 includes one second boot programmable sequencer 2 and one programmable timing controller 3 which are common for the two domains and what is the same as the second embodiment is that the system controlling circuit 1 includes two parameterized system controllers 8_1 and 8_2 which are dedicated respectively for the domains and an interface Exchange IF is provided. The interface Exchange IF is used not only for information exchange between the domains, also for sending and receiving information by the second boot programmable sequencer 2 to/from the parameterized system controller 8_2.

According to the start-up signal Invoke, the first boot HW controller 4 supplies, inter alia, a power supply control signal, reset signal, and clock signal to the basic timing generator 5, ROM 6, and second boot programmable sequencer 2. The basic timing generator 5 is activated by the first boot HW controller 4 and supplies primary signals, such as a power supply control signal, reset signal, and clock signal, to the programmable timing controllers 3. The second boot programmable sequencer 2, when it is activated by a signal supplied from the first boot HW controller 4, reads in encrypted sequence code and data from the ROM 6, decrypts them, and stores decrypted sequence code and data into the secured RAM 7. The second boot programmable sequencer 2 performs sequence operation in accordance with the decrypted sequence code and data and performs parameter setting and control for the programmable timing controllers 3. The second boot programmable sequencer 2 and the programmable timing controller 3 control the sequence of, inter alia, power supply control signal, reset signal, and clock signal for the domain 9-1 via the parameterized system controller 8_1 and control the sequence of, inter alia, power supply control signal, reset signal, and clock signal for the domain 9-2 through a path from the parameterized system controller 8_1 through the interface IF and via the parameterized system controller 8_2. How each controls the sequence is the same as for the first embodiment and, therefore, its description is omitted.

Although an example in which there are two domains is depicted here, the number of domains is arbitrary. An implementation in which the second embodiment and the third embodiment are combined is also possible. That is, in a case where the semiconductor device has plural domains within the same chip, it is possible that sets of the second boot programmable sequencer 2, programmable timing controller 3, and parameterized system controller 8 are provided for a subset of the plural domains such that one set is assigned for each of the domains (second embodiment) and a second boot programmable sequencer 2 and a programmable timing controller 3 which are common for domains are provided for the remaining subset of the domains (third embodiment).

Fourth Embodiment

<A Secure CPU Running One Domain is Available.>

When the semiconductor device has plural domains within the same chip and each domain is provided with a CPU, as illustrated in FIG. 7 and FIG. 9, one of the domains is run by a secure CPU in some cases. This secure CPU can be utilized to perform a part of the function of the second boot programmable sequencer 2.

Figure 10:
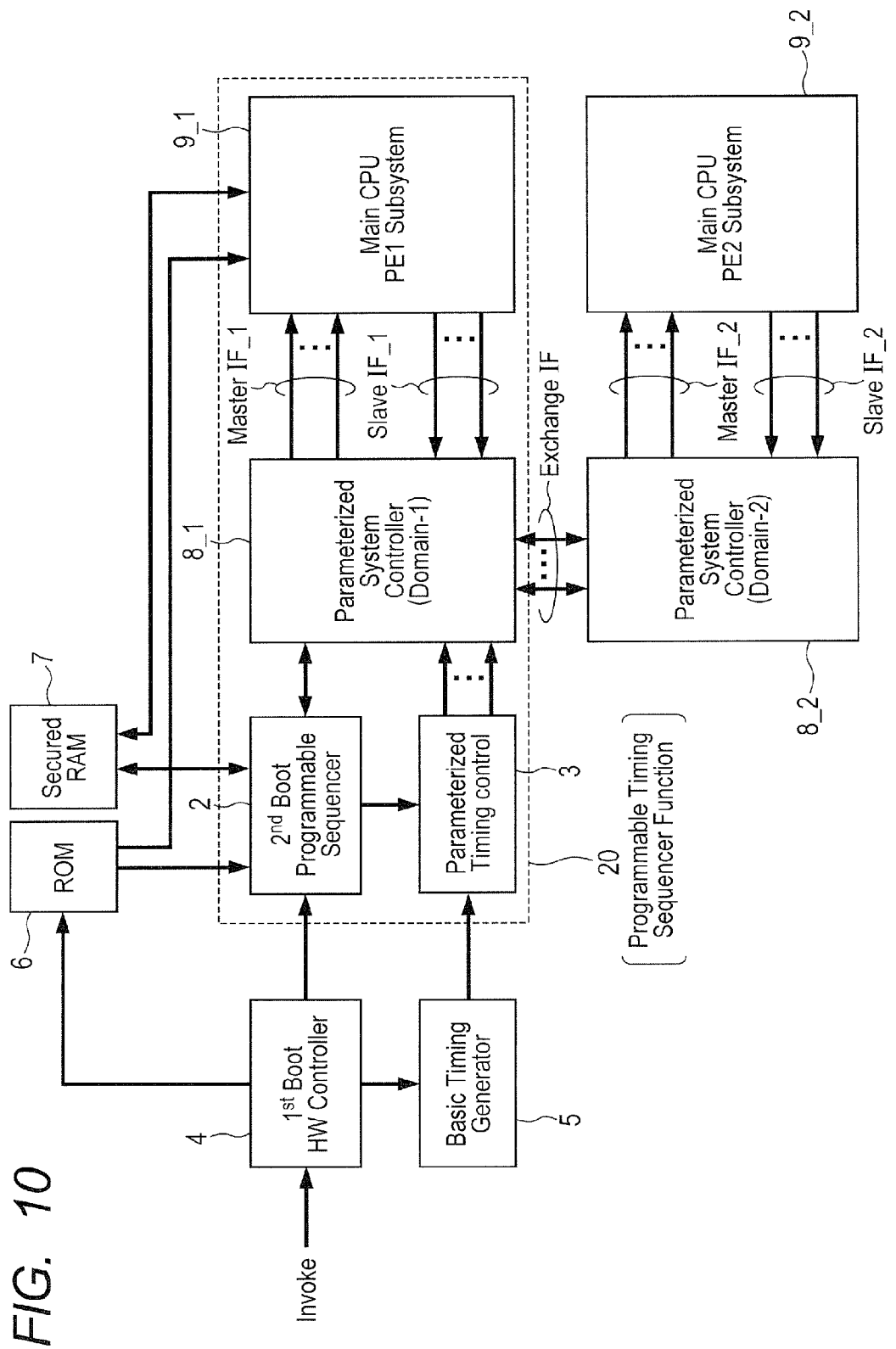
FIG. 10 is a block diagram depicting an example of configuration of a system controlling circuit of a fourth embodiment.

FIG. 10 is a block diagram depicting an example of configuration of a system controlling circuit 1 of a fourth embodiment. A semiconductor device having the system controlling circuit 1 mounted on board has, e.g., two CPUs which are located in independent domains 9_1 and 9_2 respectively. A domain 9_1 is a subsystem that is run by a main CPU_PE1 (Main CPU PE1 Subsystem) and a domain 9_2 is a subsystem that is run by a main CPU_PE2 (Main CPU PE2 Subsystem). In the fourth embodiment, descriptions are provided assuming that the main CPU_PE1 in the domain 9_1 is a secure CPU.

The system controlling circuit 1 is started up by a start-up signal Invoke, such as reset which is input from outside of the chip or power-on reset which is generated by sensing power-on, and supplies groups of system control signals Master IF_1 and Master IF_2 to the domains 9_1 and 9_2 respectively. Each of Master IF_1 and Master IF_2 is a group of signals including at least one of a power supply control signal, a reset signal, and a clock signal. From the domains 9_1 and 9_2, status signals Slave IF_1 and Slave IF_2, each of which indicates relevant status, are fed back to parameterized system controllers 8_1 and 8_2 respectively.

As is the case for FIG. 9, the system controlling circuit 1 includes a first boot HW controller 4, a basic timing generator 5, and a secured RAM 7 and a ROM 6 is externally attached thereto or incorporated therein, but differently from FIG. 9, the secured RAM 7 and the ROM 6 are configured so that they can also be accessed from the secure CPU in the domain 9_1. The system controlling circuit 1 includes a second boot programmable sequencer 2 and a programmable timing controller 3 which are common for the two domains and two parameterized system controllers 8_1 and 8_2 which are dedicated respectively for the domains and an interface Exchange IF and, furthermore, an interface Exchange IF is provided. The interface Exchange IF is used for information exchange between the domains and, additionally, used for sending and receiving information by the second boot programmable sequencer 2 as well as the secure CPU in the domain 9_1 to/from the parameterized system controller 8_2. In the fourth embodiment, in this way, the second boot programmable sequencer 2, programmable timing controller 3, parameterized system controller 8_1, and the secure CPU in the domain 9_1 implement the programmable timing sequencer function 20.

According to the start-up signal Invoke, the first boot HW controller 4 supplies, inter alia, a power supply control signal, reset signal, and clock signal to the basic timing generator 5, ROM 6, and second boot programmable sequencer 2. The basic timing generator 5 is activated by the first boot HW controller 4 and supplies primary signals, such as a power supply control signal, reset signal, and clock signal, to the programmable timing controllers 3. The second boot programmable sequencer 2, when it is activated by a signal supplied from the first boot HW controller 4, reads in encrypted sequence code and data from the ROM 6, decrypts them, and stores decrypted sequence code and data into the secured RAM 7. The second boot programmable sequencer 2 performs sequence operation in accordance with the decrypted sequence code and data and performs parameter setting and control for the programmable timing controllers 3. The second boot programmable sequencer 2 and the programmable timing controller 3 control the sequence of, inter alia, power supply control signal, reset signal, and clock signal for the domain 9-1 via the parameterized system controller 8_1. Thereby, the secure CPU in the domain 9_1 is booted up. The secure CPU controls the sequence of, inter alia, power supply control signal, reset signal, and clock signal for the domain 9-2 by, inter alia, setting required parameters for and sending a command to the parameterized system controller 8_2 via the interface Exchange IF. Even though the control executor changes over, how each performs control is the same as for the first embodiment.

It is thus possible to utilize the secure CPU to perform a part of the function of the system controlling circuit and enhance sequence control. Besides, the secured RAM 7 is shared between the second boot programmable sequencer 2 and the secure CPU in the domain 9_1 and increase in the chip area can be suppressed.

Although an example in which there are two domains is depicted here, the number of domains is arbitrary. An implementation in which either or both of the second embodiment and the third embodiment and the fourth embodiment are combined is also possible. That is, in a case where the semiconductor device has plural domains within the same chip, it is possible that second boot programmable sequencers 2 and programmable timing controllers 3 are provided so as to be dedicated respectively for domains for a subset of the plural domains and a second boot programmable sequencer 2 and a programmable timing controller 3 which are common for domains are provided for the remaining subset of the domains for which a secure CPU is utilized to perform control of domains other than a domain provided with the secure CPU.

Fifth Embodiment

<Plural CPUs are Controlled from Two Second Boot Programmable Sequencers.>

In the second embodiment, in a case where the semiconductor device has plural domains within the same chip, parameterized system controllers 8 are provided such that one parameterized system control is dedicated for one domain. In this implementation, parameterized system controllers 8 are to be provided in number proportional to the number of domains. For example, when many CPUs are provided and each CPU is an unit for which power supply control and clock control are performed as one domain, parameterized system controllers 8 are to be provided in number proportional to the number of the CPUs. Alternatively, in a fifth embodiment, one of the plural domains is controlled by combination of control from plural parameterized system controllers.

Figure 11:
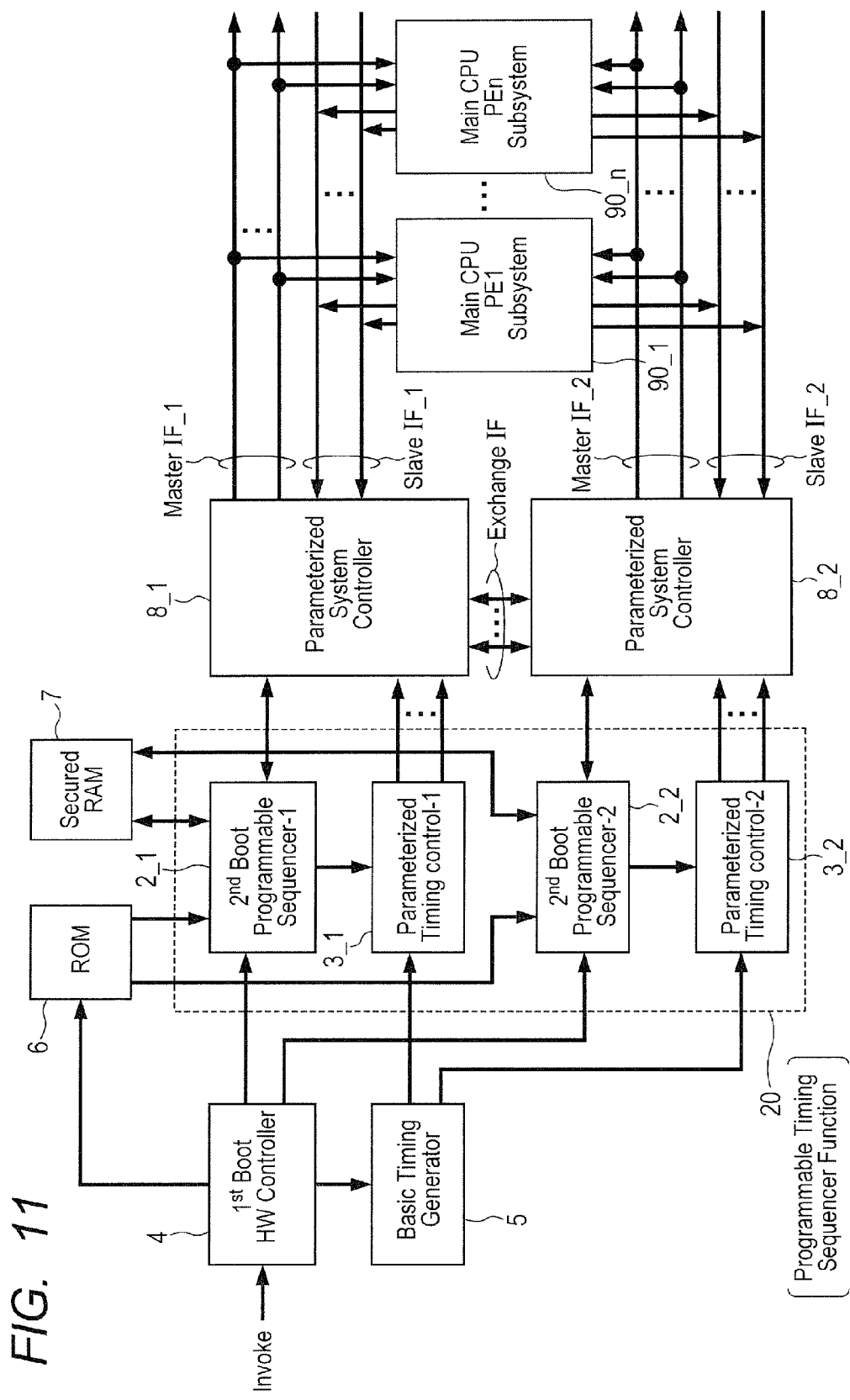
FIG. 11 is a block diagram depicting an example of configuration of a system controlling circuit of a fifth embodiment.

FIG. 11 is a block diagram depicting an example of configuration of a system controlling circuit of the fifth embodiment. A semiconductor device having the system controlling circuit 1 mounted on board has, e.g., n pieces of CPUs which are located in domains 9_1 to 9_n. A domain 9_1 is a subsystem that is run by a main CPU_PE1 (Main CPU PE1 Subsystem) and a domain 9_n is a subsystem that is run by a main CPU_PEn (Main CPU PEn Subsystem).

The system controlling circuit 1 includes a first boot HW controller 4 and a basic timing generator 5 and is started up by a start-up signal Invoke, such as reset which is input from outside of the chip or power-on reset which is generated by sensing power-on. The system controlling circuit 1 further includes a secured RAM 7 and a ROM 6 is externally attached thereto or incorporated therein, and includes two second boot programmable sequencers 2_1 and 2_2, two programmable timing controllers 3_1 and 3_2, and two parameterized system controllers 8_1 and 8_2. The two parameterized system controllers 8_1 and 8_2 supply groups of system control signals Master IF_1 and Master IF_2 to the domains 9_1 to 9_n. From the domains 9_1 to 9_n, status signals Slave IF_1 and Slave IF_2, each of which indicates relevant status, are fed back respectively. The two parameterized system controllers 8_1 and 8_2 are provided with an interface Exchange IF for exchanging information with each other.

As is the case for the second embodiment described with reference to FIG. 7, the ROM 6 stores encrypted sequence code and data for the second boot programmable sequencer 2_1 and encrypted sequence code and data for the second boot programmable sequencer 2_2 and is accessible from both the second boot programmable sequencers 2_1 and 2_2. The secured RAM 7 is configured so that it is also accessible from both the second boot programmable sequencers 2_1 and 2_2 and can store decrypted sequence code and data for the second boot programmable sequencer 2-1 and for the second boot programmable sequencer 2_2. Instead of this configuration in which the RAM is shared, the second boot programmable sequencers 2_1 and 2_2 may be provided with dedicated secured RAMs respectively. According to the start-up signal Invoke, the first boot HW controller 4 supplies, inter alia, a power supply control signal, reset signal, and clock signal to the basic timing generator 5, ROM 6, and second boot programmable sequencers 2_1 and 2_2. The basic timing generator 5 is activated by the first boot HW controller 4 and supplies primary signals, such as a power supply control signal, reset signal, and clock signal, to the programmable timing controllers 3_1 and 3_2. The second boot programmable sequencer 2_1, when it is activated by a signal supplied from the first boot HW controller 4, reads in encrypted sequence code and data from the ROM 6, decrypts them, and stores decrypted sequence code and data into the secured RAM 7. Each of the second boot programmable sequencers 2_1 and 2_2 may perform decryption of encrypted sequence code and data. The second boot programmable sequencers 2_1 and 2_2 each perform sequence operation in accordance with the decrypted sequence code and data and perform parameter setting and control for the programmable timing controllers 3_1 and 3_2 respectively.

The second boot programmable sequencer 2_1 and the programmable timing controller 3_1 supply a parameter and a command or a control signal to the domains 9_1 to 9_n by means of the Master IF_1 via the parameterized system controller 8_1. The second boot programmable sequencer 2_2 and the programmable timing controller 3_2 supply a parameter and a command or a control signal to the domains 9_1 to 9_n by means of the Master IF_2 via the parameterized system controller 8_2. According to parameters and commands or control signals supplied by means of the Master IF_1 and Master IF_2, the domains 9_1 to 9_n perform sequence control of, inter alia, a power supply control signal, reset signal, and clock signal. The domains 9_1 to 9_n feed back status information relevant to each domain by means of the Slave IF_1 and Slave IF_2 to the parameterized system controllers 8_1 and 8_2 respectively. When sequence control of plural domains depends on the status of each of the domains, involved status information is sent and received via the interface Exchange IF.

According to the configuration described above, by controlling one processor element PE from two different parameterized system controllers 8, it is possible to change a path for control depending on the PE operating conditions. It is basically preferable to provide a configuration in which duplicated paths for control are available to be selectable to enable control through either path, but control through only one path may apply to a subset of the domains. Controlling plural PEs that should desirably operate in parallel by one common parameterized system controller 8 can result in decrease in the number of parameterized system controllers 8 and control paths. On the other hand, to control PEs that should desirably be controlled differently, another parameterized system controller 8 can also be used. Because a selection can be made of two different parameterized system controllers 8 in order to control one PE, in case system control through one path has failed, system control can be maintained by control through the other path. It is also possible to select an optimal control path in response to an electrical characteristic problem, such as power consumption and noise occurring in the chip device, and control its electrical characteristics.

While the invention made by the present inventors has been described specifically based on its embodiments hereinbefore, it will be appreciated that the present invention is not limited to the described embodiments and various modifications may be made thereto without departing from the gist of the invention.

For example, blocks into which division is made, depicted in the block diagrams, are only exemplary. Modification, such as merging a part or all of the functions of one block with the functions of another block, thus changing the block to another block, can be performed appropriately and optionally.

What is claimed is:

1. A semiconductor integrated circuit comprising functional blocks and a system controlling circuit that supplies a group of system control signals comprising at least one of a power supply control signal, reset signal, and clock signal to the functional blocks, wherein the system controlling circuit comprising a programmable timing controller that adjusts either or both of sequence and timing of supplying the group of system control signals to the functional blocks, based on parameters which are supplied thereto and a boot programmable sequencer that reads in encrypted sequence code and data, decrypts them, and supplies the programmable timing controller with the parameters in accordance with decrypted sequence code and data.

2. The semiconductor integrated circuit according to claim 1, wherein the system controlling circuit further comprises a first boot HW (hardware) controller, wherein the system controlling circuit can connect with a ROM (Read Only Memory) which retains the encrypted sequence code and data and comprises a RAM (Random Access Memory) comprising a secured memory which retains the decrypted sequence code and data and wherein the first boot HW controller provides a non-programmable timing sequencer function where the first boot HW controller initializes power-on reset, supplies the clock signal and the reset signal to the ROM, the RAM, and the boot programmable sequencer.

3. The semiconductor integrated circuit according to claim 1, wherein the system controlling circuit can connect with a ROM (Read Only Memory) which retains the encrypted sequence code and data and comprises a RAM (Random Access Memory) which retains the decrypted sequence code and data, wherein the system controlling circuit further comprises a first boot HW (hardware) controller and a basic timing generator, wherein the first boot HW controller supplies at least one of a power supply control signal, reset signal, and clock signal to activate the boot programmable sequencer to the boot programmable sequencer, according to a start-up signal from outside, and wherein the basic timing generator is activated by the first boot HW controller and supplies at least one of a power supply control signal, reset signal, and clock signal to the programmable timing controller.

4. The semiconductor integrated circuit according to claim 1, wherein the semiconductor integrated circuit comprises a plurality of domains, each comprising one or plural functional blocks, and wherein the system controlling circuit comprises a plurality of programmable timing controllers which are dedicated respectively for the domains and a plurality of the boot programmable sequencers which are dedicated respectively for the domains and supplies each of groups of system control signals to each of the domains.

5. The semiconductor integrated circuit according to claim 4, wherein the system controlling circuit can connect with a ROM which retains the encrypted sequence code and data and a plurality of RAMs, each of which retains sequence code and data decrypted respectively for each of the boot programmable sequencers.

6. The semiconductor integrated circuit according to claim 4, wherein the system controlling circuit can connect with a ROM which retains the encrypted sequence code and data and a single RAM which retains sequence code and data decrypted respectively for each of the boot programmable sequencers.

7. The semiconductor integrated circuit according to claim 4, wherein the system controlling circuit comprises a plurality of parameterized system controllers which are dedicated respectively for the domains, and wherein each parameterized system controller takes input of a group of system control signals for a domain under its control and a signal indicating status relevant to the domain and controls sequence of supplying a power supply, reset, or clock to one or plural functional blocks included in the domain.

8. The semiconductor integrated circuit according to claim 1, wherein the semiconductor integrated circuit comprises a plurality of domains, each comprising one or plural functional blocks, and wherein the system controlling circuit comprises the programmable timing controller and the boot programmable sequencer which are common for the domains and supplies each of groups of system control signals to each of the domains.

9. The semiconductor integrated circuit according to claim 8, wherein the system controlling circuit can connect with a ROM which retains the encrypted sequence code and data and comprises a RAM which retains the decrypted sequence code and data.

10. The semiconductor integrated circuit according to claim 9, wherein the system controlling circuit comprises a plurality of parameterized system controllers which are dedicated respectively for the domains, and wherein each parameterized system controller takes input of a group of system control signals for a domain under its control and a signal indicating status relevant to the domain and controls sequence of supplying a power supply, reset, or clock to one or plural functional blocks included in the domain.

11. The semiconductor integrated circuit according to claim 10, wherein one domain included in the domains comprises a secure CPU (Central Processing Unit) that is tamper resistant as a functional block, and wherein the secure CPU controls one or more parameterized system controllers dedicated for one or more other domains via a parameterized system controller dedicated for that domain.

12. The semiconductor integrated circuit according to claim 11, further comprising:

a first boot HW controller including a boot sequencer that controls the boot programmable sequencer, wherein the secure CPU can access the RAM.

13. The semiconductor integrated circuit according to claim 1, wherein the semiconductor integrated circuit comprises a plurality of domains, each comprising one or plural functional blocks, and wherein the system controlling circuit comprises a plurality of programmable timing controllers which are dedicated respectively for the domains and a plurality of the boot programmable sequencers which are dedicated respectively for the domains and supplies each of groups of system control signals to each of the domains.

14. The semiconductor integrated circuit according to claim 1, wherein the semiconductor integrated circuit comprises a plurality of domains, each comprising one or plural functional blocks, wherein the system controlling circuit comprises a plurality of programmable timing controllers, a plurality of the boot programmable sequencers which are dedicated for each, and a plurality of parameterized system controllers which are dedicated for each, wherein, to each parameterized system controller, a group of system control signals is supplied from its associated programmable timing controller and boot programmable sequencer, and wherein a signal indicating status relevant to one domain which is one of the plural domains is input to a plurality of parameterized system controllers and the parameterized system controllers control sequence of supplying a power supply, reset, or clock to one or plural functional blocks included in that domain.

15. The semiconductor integrated circuit according to claim 1, wherein the semiconductor integrated circuit comprises a domain comprising a plurality of processor elements, wherein the system controlling circuit comprises two programmable timing controllers, two boot programmable sequencers which are dedicated for each, and two parameterized system controllers which are dedicated for each, wherein, to the two parameterized system controllers, a group of system control signals is supplied from their associated programmable timing controller and boot programmable sequencer, and wherein the two parameterized system controllers take input of a signal indicating status relevant to each of the processor elements and control sequence of supplying a power supply, reset, or clock to the processor elements.

16. The semiconductor integrated circuit according to claim 1,
wherein the system controlling circuit further comprises a first boot HW (hardware) controller and a basic timing generator,
wherein the first boot HW controller supplies at least one of a power supply control signal, reset signal, and clock signal to activate the boot programmable sequencer to the boot programmable sequencer, according to a start-up signal from outside, and
wherein the basic timing generator is activated by the first boot HW controller and supplies at least one of a power supply control signal, reset signal, and clock signal to the programmable timing controller.

17. A semiconductor apparatus, comprising:
functional blocks; and
a system controller that supplies a group of system control signals to the functional blocks,
wherein the system controller comprises:
 a secondary boot programmable sequencer that reads in encrypted sequence code and data, decrypts them, and supplies a programmable timing controller with the parameters in accordance with decrypted sequence code and data; and
 the programmable timing controller that adjusts either or both of sequence and timing of supplying the group of system control signals to the functional blocks, based on the parameters which are supplied from the secondary boot programmable sequencer in accordance with the decrypted sequence code and data.

18. The semiconductor apparatus according to claim 17,
wherein the system controlling circuit further comprises a first boot HW (hardware) controller and a basic timing generator, and
wherein the primary boot HW controller supplies at least one of a power supply control signal, reset signal, and clock signal to activate the secondary boot programmable sequencer to the secondary boot programmable sequencer, according to a start-up signal from outside, the primary boot HW controller supplies power supply control signal, reset signal, and the clock signal to the programmable timing controller while the secondary boot programmable sequencer comprises a sequencer that operates in accordance with the decrypted sequence code and sets parameters for the programmable timing controller according to decrypted data, and
wherein the basic timing generator is activated by the first boot HW controller and supplies at least one of a power supply control signal, reset signal, and clock signal to the programmable timing controller.

19. The semiconductor apparatus according to claim 18,
wherein the basic timing generator is activated by the primary boot HW controller and supplies at least one of a power supply control signal, reset signal, and clock signal to the programmable timing controller,
wherein the primary boot HW controller comprises a non-programmable sequencer, and
wherein the secondary boot programmable sequencer, when it is activated by a signal supplied from the primary boot HW controller, reads in the encrypted sequence code and data from a read-only memory, decrypts the encrypted sequence code and data, and stores the decrypted sequence code and data into a secured random access memory.

20. The semiconductor apparatus according to claim 17, further comprising:
a plurality of domains, each comprising one or plural functional blocks; and
a primary boot HW controller including a primary boot sequencer that controls the secondary boot programmable sequencer, and
wherein the system controller comprises a plurality of the programmable timing controllers which are dedicated respectively for the domains and a plurality of secondary boot programmable sequencers which are dedicated respectively for the domains and supplies each of groups of system control signals to each of the domains.

* * * * *